US009906911B2

United States Patent
Iun et al.

(10) Patent No.: US 9,906,911 B2
(45) Date of Patent: Feb. 27, 2018

(54) SYSTEMS AND METHODS FOR UE POSITIONING IN A DISTRIBUTED ANTENNA WIRELESS SYSTEM

(71) Applicant: Telefonaktiebolaget L M Ericsson (publ), Stockholm (SE)

(72) Inventors: Edwin Vai Hou Iun, Ottawa (CA); Ping Liu, Ottawa (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 96 days.

(21) Appl. No.: 14/782,979

(22) PCT Filed: Sep. 4, 2015

(86) PCT No.: PCT/IB2015/056777
§ 371 (c)(1),
(2) Date: Oct. 7, 2015

(87) PCT Pub. No.: WO2017/037517
PCT Pub. Date: Mar. 9, 2017

(65) Prior Publication Data
US 2017/0150317 A1    May 25, 2017

(51) Int. Cl.
*H04W 4/02* (2009.01)
*H04W 24/08* (2009.01)
(Continued)

(52) U.S. Cl.
CPC ........... *H04W 4/025* (2013.01); *H04W 4/023* (2013.01); *H04W 24/08* (2013.01);
(Continued)

(58) Field of Classification Search
CPC ..... H04W 4/025; H04W 4/023; H04W 24/08; H04W 68/005; H04W 72/0413; H04W 72/14
See application file for complete search history.

(56) References Cited

U.S. PATENT DOCUMENTS 8,838,137 B2    9/2014 Bhattacharya et al.
2004/0180669 A1    9/2004 Kall
(Continued)

FOREIGN PATENT DOCUMENTS

EP    2099240 A1    9/2009
WO    2012173540 A1    12/2012
(Continued)

OTHER PUBLICATIONS

International Search Report and Written Opinion for International Patent Application No. PCT/IB2015/056777, dated May 19, 2016, 11 pages.
(Continued)

*Primary Examiner* — Kashif Siddiqui
(74) *Attorney, Agent, or Firm* — Withrow & Terranova, PLLC

(57) ABSTRACT

In some embodiments, a node associated with a distributed antenna wireless system obtains one or more combined receive signals responsive to a transmission by the wireless device. The distributed antenna wireless system comprises multiple Remote Radio Heads (RRHs) each comprising one or more receivers. Each receive branch of one or more receive branches of the distributed antenna wireless system comprises a combination of one receiver from each of the RRHs. The one or more combined receive signals comprise, for each receive branch, a combined receive signal that is a combination of signals received by the receivers comprised in the receive branch in accordance with different simultaneous ON/OFF patterns assigned to the RRHs for the receive branches. The node analyzes the one or more combined receive signals to determine information indicative of a geographic location of the wireless device.

27 Claims, 10 Drawing Sheets

(51) Int. Cl.
*H04W 68/00* (2009.01)
*H04W 72/04* (2009.01)
*H04W 72/14* (2009.01)

(52) U.S. Cl.
CPC ..... *H04W 68/005* (2013.01); *H04W 72/0413* (2013.01); *H04W 72/14* (2013.01)

(56) References Cited

U.S. PATENT DOCUMENTS

| | | | |
|---|---|---|---|
| 2008/0232328 A1* | 9/2008 | Scheinert | G01S 5/02 370/335 |
| 2012/0178473 A1 | 7/2012 | Wiren et al. | |
| 2012/0327800 A1* | 12/2012 | Kim | H04W 72/082 370/252 |
| 2014/0018103 A1 | 1/2014 | Wigren et al. | |
| 2014/0141792 A1 | 5/2014 | Larsson et al. | |
| 2014/0161447 A1* | 6/2014 | Graves | H04Q 11/0005 398/48 |
| 2014/0269322 A1* | 9/2014 | Li | H04W 28/08 370/236 |
| 2014/0302870 A1 | 10/2014 | Cui et al. | |
| 2016/0234773 A1* | 8/2016 | Choi | H04W 52/0206 |

FOREIGN PATENT DOCUMENTS

| | | |
|---|---|---|
| WO | 2014023999 A1 | 2/2014 |
| WO | 2015099582 A1 | 7/2015 |

OTHER PUBLICATIONS

Federal Communications Commission, "Wireless E911 Location Accuracy Requirements: Third Further Notice of Proposed Rulemaking," FCC 14-13, adopted Feb. 20, 2014, 95 pages.

International Preliminary Report on Patentability for International Patent Application No. PCT/IB2015/056777, dated Aug. 23, 2017, 6 pages.

* cited by examiner

| RRU | RX A | RX B | RX C | RX D |
|---|---|---|---|---|
| 1 | 0 | 0 | 0 | 0 |
| 2 | 0 | 0 | 0 | 1 |
| 3 | 0 | 0 | 1 | 0 |
| 4 | 0 | 0 | 1 | 1 |
| 5 | 0 | 1 | 0 | 0 |
| 6 | 0 | 1 | 0 | 1 |
| 7 | 0 | 1 | 1 | 0 |
| 8 | 0 | 1 | 1 | 1 |
| 9 | 1 | 0 | 0 | 0 |
| 10 | 1 | 0 | 0 | 1 |
| 11 | 1 | 0 | 1 | 0 |
| 12 | 1 | 0 | 1 | 1 |
| 13 | 1 | 1 | 0 | 0 |
| 14 | 1 | 1 | 0 | 1 |
| 15 | 1 | 1 | 1 | 0 |
| 16 | 1 | 1 | 1 | 1 |

"0" = OFF
"1" = ON

SYSTEMS AND METHODS FOR UE POSITIONING IN A DISTRIBUTED ANTENNA WIRELESS SYSTEM

This application is a 35 U.S.C. § 371 national phase filing of International Application No. PCT/IB2015/056777, filed Sep. 4, 2015, the disclosure of which is incorporated herein by reference in its entirety.

TECHNICAL FIELD

The present disclosure relates to wireless device positioning in a distributed antenna wireless system.

BACKGROUND

When deploying wireless communications networks, there is a balance between coverage and capacity. On the one hand, a deployment including a few large cells can provide great coverage but at a cost of reduced capacity. On the other hand, a deployment with many small cells creates better capacity and throughput, but may not provide the desired coverage. Hence, there is often a combination of larger cells to provide sufficient coverage with smaller cells to provide better capacity. However, when the cells get too small, wireless terminals moving in the network cause a great number of handovers which causes significant overhead. Moreover, providing coverage indoors using many small cells can be quite costly, with a radio base station for each such small cell.

One solution to these problems is to use Remote Radio Heads (RRHs), where several RRHs connected to the same radio base station share the same cell. In this way, a single radio base station can, e.g., provide coverage in different parts of an indoor environment (e.g., a building) by placing the RRHs appropriately. Moreover, a wireless device can move between the coverage of different RRHs while staying within the same cell, thereby avoiding handovers.

Against this backdrop, User Equipment (UE) is a core requirement in Enhanced-911 (E911) and other services provided in a wireless network. Standard and regulatory bodies such as the Third Generation Partnership Project (3GPP) and the Federal Communications Commission (FCC) have increased their location requirements on the precision of indoor UE location.

However, since a single cell is spanned by multiple RRHs, the granularity of location determination is quite large. This leads to insufficient positioning accuracy in locating wireless devices, leading to issues in complying with increased accuracy of positioning requirements for emergency calls such as those specified in E911 by the FCC Communications Security, Reliability, and Interoperability Council (CSRIC). Positioning is also beneficial for other types of services, such as for targeted location based messaging. Since the RRHs are often deployed indoors, satellite based positioning such as Global Positioning System (GPS) is often unavailable.

As such, there is a need for systems and methods for determining the location of wireless devices (e.g., UEs) in a distributed antenna system (e.g., a cellular network deployment utilizing multiple RRHs in a single cell, e.g., in an indoor environment).

SUMMARY

Systems and methods relating to locating a wireless device in a distributed antenna wireless system are disclosed. In some embodiments, a node associated with a distributed antenna wireless system is operable to determine a geographic location of a wireless device. The node obtains one or more combined receive signals responsive to a transmission by the wireless device. The distributed antenna wireless system comprises multiple Remote Radio Heads (RRHs) each comprising one or more receivers. Each receive branch of one or more receive branches of the distributed antenna wireless system comprises a combination of one receiver from each of the RRHs. The one or more combined receive signals comprise, for each receive branch of the distributed antenna wireless system, a combined receive signal that is a combination of signals received by the receivers comprised in the receive branch in accordance with different simultaneous ON/OFF patterns assigned to the RRHs for the one or more receive branches. The node analyzes the one or more combined receive signals to determine information indicative of a geographic location of the wireless device.

In some embodiments, each RRH comprises multiple receivers, the one or more receive branches is multiple receive branches wherein each receive branch comprises a combination of one of the receivers from each of the RRHs, and the one or more combined receive signals is multiple combined receive signals that comprise, for each receive branch, a combined receive signal that is a combination of signals received by the receivers comprised in the receive branch in accordance with different simultaneous ON/OFF patterns assigned to the RRHs for the receive branches.

In some embodiments, the node is further operable to assign the different simultaneous ON/OFF patterns to the RRHs for the receive branches. In some embodiments, the node randomly assigns the different simultaneous ON/OFF patterns to the RRHs for the receive branches.

In some embodiments, the node is further operable to configure the RRHs with the different simultaneous ON/OFF patterns assigned to the RRHs for the receive branches. In other embodiments, the signals received by the receivers are combined by an Intermediate Radio Unit (IRU), and the node is further operable to configure the IRU with the different simultaneous ON/OFF patterns assigned to the RRHs for the receive branches.

In some embodiments, the node is further operable to trigger the transmission by the wireless device. In some embodiments, the node is further operable to trigger the transmission by the wireless device via a paging message such that the transmission is a page response. In other embodiments, the node is further operable to trigger the transmission by the wireless device via an uplink grant such that the transmission is an uplink data transmission in accordance with the uplink grant.

In some embodiments, in order to analyze the combined signals, the node is further operable to obtain measurements of received signal energy and/or characteristic(s) for the combined signals within a predefined frequency range used for the transmission by the wireless device during a corresponding time window, and compare the measurements for the combined receive signals to the different simultaneous ON/OFF patterns assigned to the RRHs for the receive branches of the distributed antenna wireless system to identify one of the RRHs that is closest to the wireless device as a closest RRH.

Further, in some embodiments, the node is further operable to change the different simultaneous ON/OFF patterns assigned to the RRHs; and, after changing the different simultaneous ON/OFF patterns assigned to the RRHs, repeat the process of obtaining combined receive signals responsive to a transmission by a wireless device and analyzing the combined receive signals to determine information indicative of the geographic location of the wireless device.

In some embodiments, the node is further operable to assign and configure a different ON/OFF pattern for the closest RRU and each RRU of multiple neighboring RRUs of the closest RRU, trigger a second transmission by the wireless device, and triangulate the geographic location of the wireless device based on second combined signals obtained for the receive branches of the distributed antenna wireless system responsive to the second transmission by the wireless device.

In some embodiments, the node is further operable to use the information indicative of the geographic location of the wireless device to selectively activate transmitters and/or receivers of one or more of the RRHs for communication with the wireless device.

In other embodiments, a node associated with a distributed antenna wireless system is operable to determine a geographic location of a wireless device. The node is operable to divide RRHs in the distributed antenna wireless system into M zones, where M is equal to a select number of different simultaneous ON/OFF patterns for receive branches of the distributed antenna wireless system. The node is further operable to assign and configure a different simultaneous ON/OFF pattern for the plurality of receive branches to each of the M zones, trigger a transmission by a wireless device, and analyze resulting combined receive signals for the receive branches to identify a zone, from the M zones, in which the wireless device is located. The node is further operable to, if the number of RRHs in the identified zone is less than or equal to a threshold, the threshold being equal to or less than a number of available different simultaneous ON/OFF patterns, assign and configure a different simultaneous ON/OFF pattern for the receive branches to each of the RRHs in the identified zone, trigger a transmission by the wireless device, and analyze resulting combined receive signals for the receive branches to identify the RRH, from the RRHs in the identified zone, that is closest to the wireless device.

In some embodiments, the node is further operable to, if the number of RRHs in the identified zone is greater than the threshold, divide the RRHs in the identified zone into J subzones, where J is equal to a select number of different simultaneous ON/OFF patterns for the receive branches of the distributed antenna wireless system and J may or may not be equal to M. The node is further operable to assign and configure a different simultaneous ON/OFF pattern for the receive branches to each of the J subzones, trigger a transmission by the wireless device, and analyze resulting combined receive signals for the receive branches to identify a subzone, from the J subzones, in which the wireless device is located.

Further, in some embodiments, the node is further operable to successively repeat the steps of dividing the identified (sub)zone into J subzones, assigning and configuring a different simultaneous ON/OFF pattern for the receive branches to each of the J subzones, triggering a transmission by the wireless device, and analyzing resulting combined receive signals for the receive branches to identify a subzone in which the wireless device is located until the number of RRHs in the identified subzone is less than or equal to the threshold.

In some embodiments, the node is further operable to, when the number of RRHs in the identified subzone is less than or equal to the threshold, assign and configure a different simultaneous ON/OFF pattern for the receive branches to each of the RRHs in the identified subzone, trigger a transmission by the wireless device, and analyze resulting combined receive signals for the receive branches to identify the RRH, from the RRHs in the identified subzone, that is closest to the wireless device.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1A:
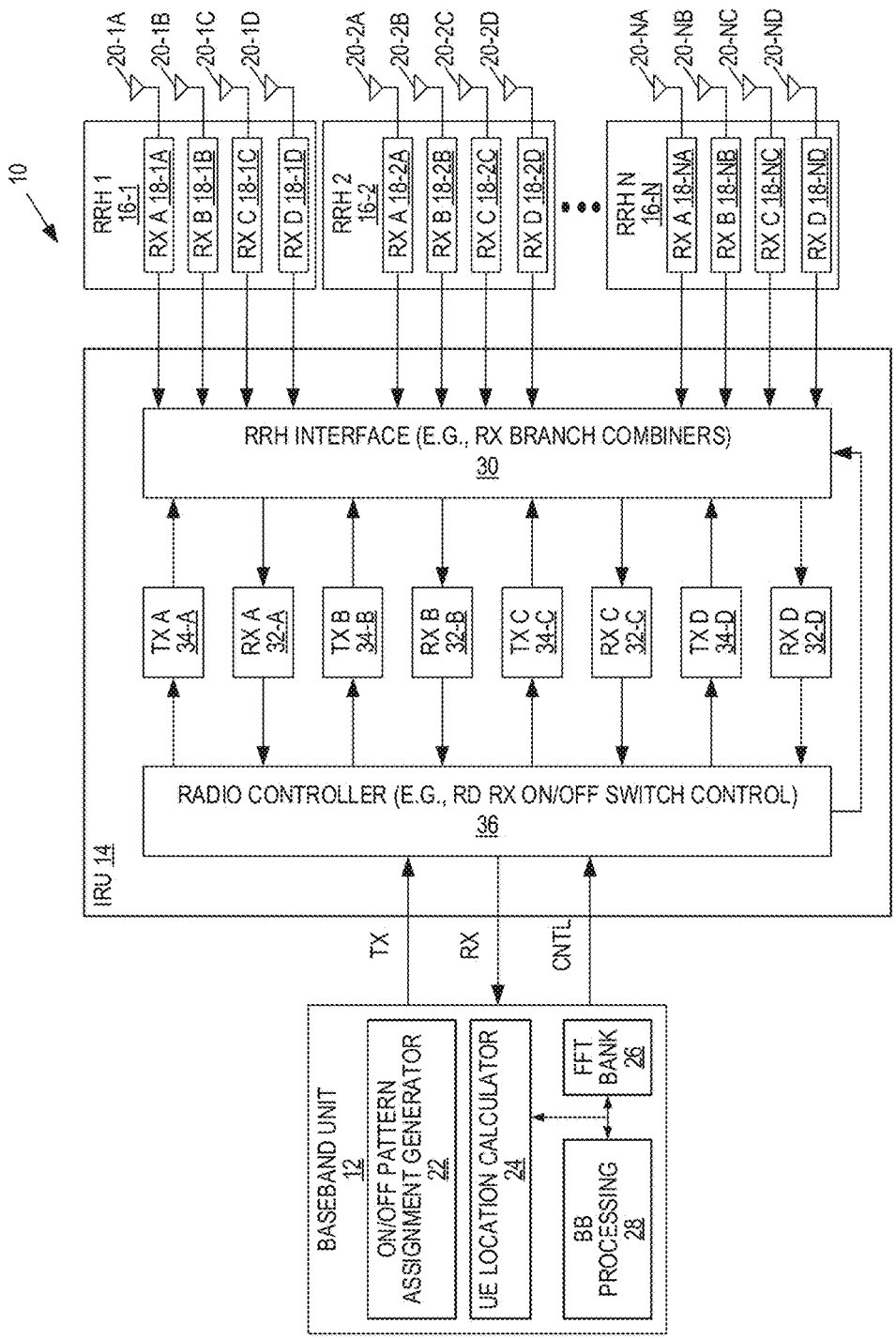
FIGS. 1A and 1B illustrate a distributed antenna wireless system according to some embodiments of the present disclosure.

Systems and methods for wireless device positioning in a distributed antenna wireless system are disclosed. In this regard, FIG. 1A illustrates a distributed antenna wireless system 10 according to some example embodiments of the present disclosure. In particular, the distributed antenna wireless system 10 is, in some preferred embodiments, a base station and associated Remote Radio Heads (RRHs) serving a cell in a cellular communications network. As illustrated, in this example, the distributed antenna wireless system 10 includes a baseband unit 12, an Intermediate Radio Unit (IRU) 14 (which is sometimes referred to as an Indoor Radio Unit), and a number (N) of RRHs 16-1 through 16-N (which are generally referred to herein collectively as RRHs 16 and individually as RRH 16), where N is greater than 1 and, in many deployment scenarios, is much greater than 1. For example, in some embodiments, the baseband unit 12 is implemented in a base station (e.g., a Third Generation Partnership Project (3GPP) Long Term Evolution (LTE) enhanced or evolved Node B (eNB)). Note that while in this example there is one baseband unit 12, one IRU 14, and multiple RRHs 16, the present disclosure is not limited thereto. In some other embodiments, there may be multiple IRUs 14 and multiple RRHs 16. Further, while separate in the illustrated example, in some other embodiments, the baseband unit 12 and the IRU 14 may be implemented together as a single unit.

The systems and methods disclosed herein are particularly beneficial in deployments where the RRHs 16 are in an indoor environment such as, e.g., inside a building, but are not limited thereto. The RRHs 16 are generally radios (e.g., Radio Frequency (RF) front-ends) distributed throughout an environment and are, therefore, remote from the baseband unit 12 and the IRU 14. Note that the implementation of the RRHs 16 illustrated in FIG. 1A and described herein is only an example. The RRHs 16 can have different configurations depending on the particular implementation. For example, in some embodiments, the RRHs 16 include only the RF front end. However, in other embodiments, the RRHs 16 also include the IRU 14 (i.e., an intermediate frequency processing unit). In other words, in some other embodiments, the functionality of the IRU 14 may be distributed among the RRHs 16.

The RRHs 16 include, among other things, receivers (RXs) 18 coupled to corresponding antennas 20. In this particular example, the distributed antenna wireless system 10 is a 4×4 Multiple Input Multiple Output (MIMO) system that includes four receive branches, which are referred to herein as receive branches A, B, C, and D. As such, in this example, the RRH 16-1 includes receiver 18-1A that is coupled to antenna 20-1A for receive branch A, receiver 18-1B that is coupled to antenna 20-1B for receive branch B, receiver 18-1C that is coupled to antenna 20-1C for receive branch C, and receiver 18-1D that is coupled to antenna 20-1D for receive branch D. Likewise, the RRH 16-2 includes receiver 18-2A that is coupled to antenna 20-2A for receive branch A, receiver 18-2B that is coupled to antenna 20-2B for receive branch B, receiver 18-2C that is coupled to antenna 20-2C for receive branch C, and receiver 18-2D that is coupled to antenna 20-2D for receive branch D; and the RRH 16-N includes receiver 18-NA that is coupled to antenna 20-NA for receive branch A, receiver 18-NB that is coupled to antenna 20-NB for receive branch B, receiver 18-NC that is coupled to antenna 20-NC for receive branch C, and receiver 18-ND that is coupled to antenna 20-ND for receive branch D. Note that 4×4 MIMO is only an example. The distributed antenna wireless system 10 may include any number of one or more receive branches, where the RRHs 16 may include any number of one or more receivers 18. Further, different RRHs 16 may include different numbers for the same number of receivers 18, depending on the particular implementation.

Figure 1B:
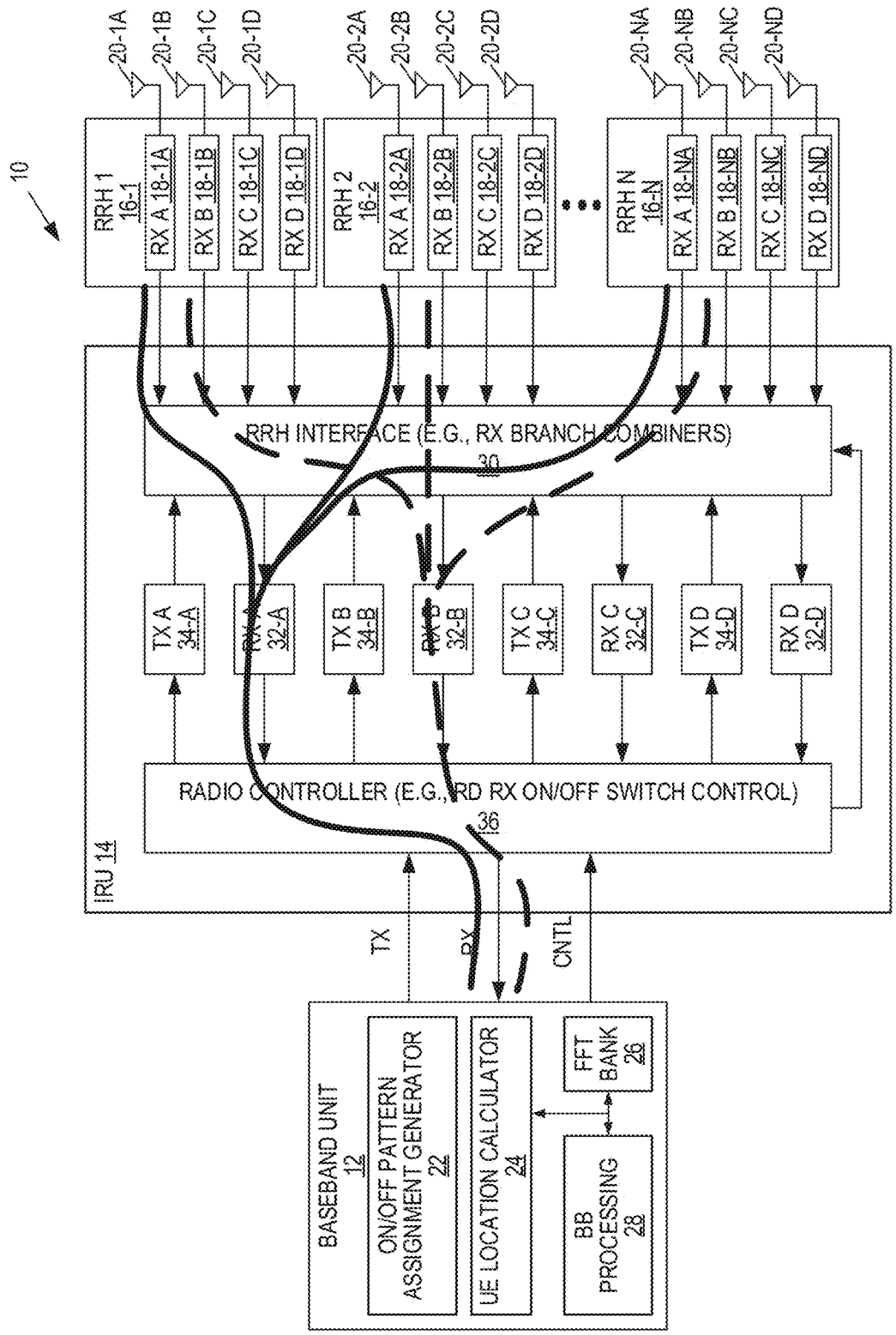

As discussed below, signals received by the receivers 18-1A, 18-2A, . . . , 18-NA of the RRHs 16-1, 16-2, . . . , 16-N, respectively, are combined in the IRU 14 to provide a combined signal for receive branch A. Likewise, the signals received by the receivers 18-1B, 18-2B, . . . , 18-NB of the RRHs 18-1, 18-2, . . . , 18-N, respectively, are combined in the IRU 14 to provide a combined signal for receive branch B; the signals received by the receivers 18-1C, 18-2C, . . . , 18-NC of the RRHs 18-1, 18-2, . . . , 18-N, respectively, are combined in the IRU 14 to provide a combined signal for receive branch C; and the signals received by the receivers 18-1D, 18-2D, . . . , 18-ND of the RRHs 18-1, 18-2, . . . , 18-N, respectively, are combined in the IRU 14 to provide a combined signal for receive branch D. This is illustrated in FIG. 1B.

Satisfying UE location requirements for UEs served by the distributed antenna wireless system 10, particularly in an indoor environment, is challenging. Specifically, when using macro base stations in an outdoor environment, triangulation may be used to further pinpoint the location of a UE within a cell. However, in the distributed antenna wireless system 10 the RRHs 16 are typically homogeneous (i.e., the same). The uplink signals received by the various receivers 18 of the RRHs 16 are combined to provide the combined receive signals for the corresponding receive branches of the distributed antenna wireless system 10. In conventional systems, when a particular UE transmits an uplink signal, the baseband unit 12 cannot then determine which of the RRHs 16 received the uplink signal (or at least which RRH 16 received the uplink signal with the strongest signal strength). As such, the baseband unit 12 is, in conventional systems, unable to determine which RRH 16 is closest to the UE and is also unable to triangulate the location of the UE within the cell served by the RRHs 16.

In order to overcome these challenges, the distributed antenna wireless system 10 utilizes different simultaneous ON/OFF patterns for the receive branches for the RRHs 16 to enable the baseband unit 12 to, e.g., determine the RRH 16 that is closest to a particular UE. As used herein, an ON/OFF pattern assigned to a RRH 16 is a unique pattern that defines an ON/OFF state of the receivers 18 of that RRH 16 during a time window in which a transmission of a UE (for which the location is to be determined) is received. As used herein, the ON state of a receiver 18 can be controlled at the receiver 18 or the corresponding RRH 16 by, e.g., disabling the receiver 18 or can be controlled at the IRU 14 by, e.g., controlling a gain applied to the received signal from the receiver 18 (e.g., applying a gain of 1 for the ON state or applying a gain of zero for the OFF state). Thus, the ON state is to be understood as the equivalent to setting the gain for the received signal from the receiver 18 to 1 or sufficiently high so that the amount of energy received is interpreted as a signal being received. Conversely, as used herein, the OFF state of a receiver 18 can be controlled at the receiver 18 or the corresponding RRH 16 by, e.g., enabling the receiver 18 or can be controlled at the IRU 14 by, e.g., controlling a gain applied to the received signal from the receiver 18. Thus, the OFF state is to be understood as the equivalent to setting the gain for the received signal from the receiver 18 to zero or sufficiently low so that the amount of energy received is interpreted as no signal being received.

By assigning different simultaneous ON/OFF patterns to different RRHs 16, the baseband unit 12 is then able to analyze the combined signals for the received branches to determine which of the RRHs 16 is closest to the UE. Since the RRHs 16 are typically arranged in a dense deployment (e.g., 20 meter (m) or less spacing between the RRHs 16, according to one exemplary embodiment), the location of the UE is then known to within a predetermined precision range (e.g., ±10 m in a deployment that uses 20 m spacing between the RRHs 16). In some embodiments, additional procedures may be performed to further improve the precision of the determined location of the UE.

In this regard, the baseband unit 12 includes an ON/OFF pattern assignment generator 22, a UE location calculator 24, a Fast Fourier Transform (FFT) bank 26, and baseband processing circuitry 28, each of which is implemented in hardware or a combination of hardware and software (e.g., software stored in memory and executed by one or more processors). Notably, while the ON/OFF pattern assignment generator 22 and the UE location calculator 24 are illustrated as being implemented in the baseband unit 12 in embodiments described herein, the functionality of the ON/OFF pattern assignment generator 22 and/or the UE location calculator 24 may be implemented in another node(s) in or associated with the distributed antenna wireless system 10 and/or distributed among multiple nodes (e.g., the baseband unit 12 and other node(s)).

As discussed below, the ON/OFF pattern assignment generator 22 operates to assign simultaneous ON/OFF patterns to the RRHs 16 and configure the RRHs 16 and/or the IRU 14 with the assigned ON/OFF patterns. Notably, in some embodiments, the number of unique ON/OFF patterns available for assignment is greater than or equal to the number (N) of RRHs 16 and, as such, each of the RRHs 16 is assigned a different ON/OFF pattern. However, in other embodiments, the number of unique ON/OFF patterns available for assignment is less than the number (N) of RRHs 16 and the patterns are assigned to different RRH zones (i.e., different sets of the RRHs 16). A search procedure may then be performed to determine the RRH 16 that is closest to the UE of interest. The UE location calculator 24 operates to calculate, or otherwise determine, the location of a UE of interest based on a comparison of outputs of the FFT bank 26 for each of the combined receive signals and the ON/OFF patterns assigned to the RRHs 16. Notably, while the FFT bank 26 is used in the embodiments described herein, the present disclosure is not limited to the use of the FFT bank 26. Other mechanisms for measuring the received signal strength and/or characteristic of the combined signals in the appropriate frequency range and time window (corresponding to an uplink transmission from a UE to be located) can be used. For example, bandpass filters and power meters may alternatively be used. The baseband processing circuitry 28 performs normal or conventional baseband processing of the FFT transformed combined receive signals for the receive branches of the distributed antenna wireless system 10.

The IRU 14 includes an RRH interface 30, receive circuitry 32-A through 32-D for the receive branches, transmit circuitry 34-A through 34-D for transmit branches, and a radio controller 36, each of which is implemented in hardware or a combination of hardware and software. The RRH interface 30 generally operates to combine signals received by the receivers 18-1A, 18-2A, . . . , 18-NA of the RRHs 16-1, 16-2, . . . , 16-N, respectively, to provide a combined signal for receive branch A, which is then processed by the receive circuitry 32-A for receive branch A. Likewise, the RRH interface 30 combines signals received by the receivers 18-1B, 18-2B, . . . , 18-NB of the RRHs 16-1, 16-2, . . . , 16-N, respectively, to provide a combined signal for receive branch B, which is then processed by the receive circuitry 32-B for receive branch B. The RRH interface 30 combines signals received by the receivers 18-1C, 18-2C, . . . , 18-NC of the RRHs 16-1, 16-2, . . . , 16-N, respectively, to provide a combined signal for receive branch C, which is then processed by the receive circuitry 32-C for receive branch C. The RRH interface 30 combines signals received by the receivers 18-1D, 18-2D, . . . , 18-ND of the RRHs 16-1, 16-2, . . . , 16-N, respectively, to provide a combined signal for receive branch D, which is then processed by the receive circuitry 32-D for receive branch D. The receive circuitry 32 may perform any suitable receive operations such as, for example, filtering, Analog to Digital (A/D) conversion, or the like. In this example, the combined receive signals output by the receive circuitry 32 are provided to the baseband unit 12 via the radio controller 36.

In a similar manner, with respect to transmission, a transmit signal is provided to the IRU 14 from the baseband unit 12. The transmit signal is provided to the transmit circuitry 34-A through 34-D for the transmit branches A through D, respectively. The transmit circuitry 34 performs any suitable transmit processing such as, for example, Digital to Analog (D/A) conversion, filtering, or the like. The resulting transmit signals are provided to the RRH interface 30, where the transmit signals are split and provided to the RRHs 16 for transmission.

Figure 2:
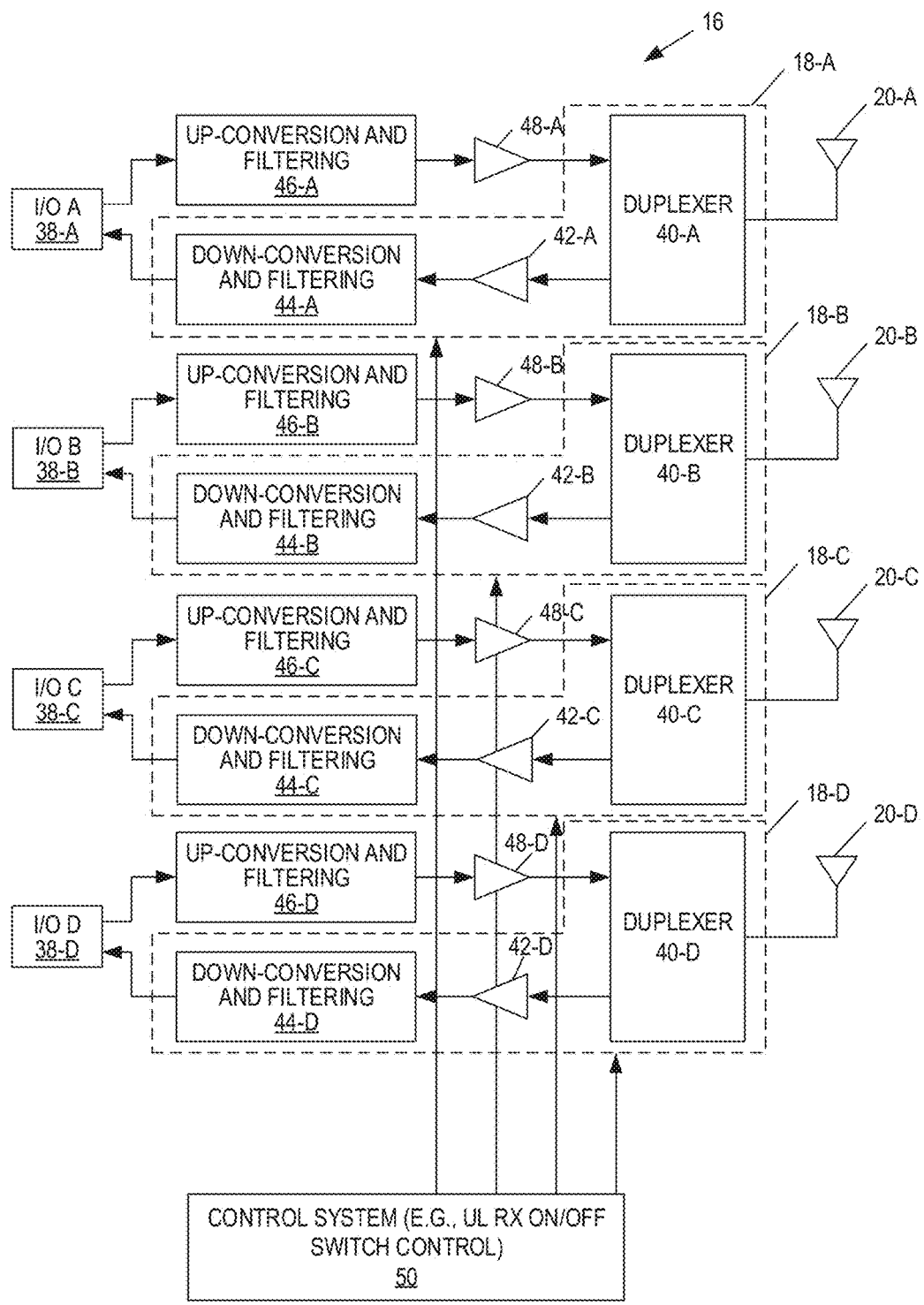
FIG. 2 is a more detailed block diagram of a Remote Radio Head (RRH) according to some embodiments of the present disclosure.

FIG. 2 illustrates the RRH 16 in more detail according to some embodiments of the present disclosure. Note that the RRH 16 of FIG. 2 is any one of the RRHs 16-1, 16-2, 16-3, and 16-4 of FIGS. 1A and 1B. In other words, FIG. 2 and the following discussion is equally applicable to each of the RRHs 16-1, 16-2, 16-3, and 16-4 of FIGS. 1A and 1B. As such, in this context, the receivers 18 of the RRH 16 of FIG. 2 are referred to as receivers 18-A, 18-B, 18-C, and 18-D.

As illustrated, the RRH 16 includes Input/Output (I/O) circuits 38-A through 38-D. The receivers 18-A through 18-D include duplexers 40-A through 40-D, amplifiers 42-A through 42-D, and down-conversion and filtering circuitry 44A through 44D, respectively. The RRH 16 also includes transmitters formed by up-conversion and filtering circuitry 46-A through 46-D, amplifiers 48-A through 48-D, and the duplexers 40-A through 40-D, respectively. The RRH 16 also includes a control system 50 that, at least in some embodiments, operates to activate/deactivate the receivers 18 of the RRH 16 according to the ON/OFF pattern with which it is configured. In this example, the control system 50 activates (i.e., turns "ON") and deactivates (i.e., turns "OFF") the receivers 18 by, e.g., controlling the corresponding amplifiers 42 (e.g., turn off the amplifier 42 to turn off the corresponding receiver 18) and/or controlling the corresponding down-conversion and filtering circuitry 44 (e.g., opening a switch within the down-conversion and filtering circuitry 44 to turn off the corresponding receiver 18). However, other activation/deactivation mechanisms can be used.

Figures 3A, 3B:
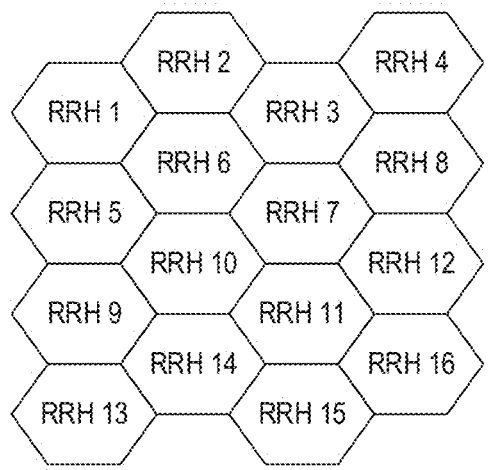
FIGS. 3A and 3B illustrate one example of assigning simultaneous receiver ON/OFF patterns to the RRHs in a distributed antenna wireless system.

FIGS. 3A and 3B illustrate the assignment of different simultaneous ON/OFF patterns to the RRHs 16 according to one example embodiment of the present disclosure. In this example, as illustrated in FIG. 3A, there are sixteen RRHs 16, referenced as RRH 1 through RRH 16. The distributed antenna wireless system 10 has four receive branches, namely, receive branches A, B, C, and D; and each of the RRHs 16 has four receivers 18 for the four receive branches, respectively. As illustrated in FIG. 3B, the RRHs 16 are assigned different simultaneous ON/OFF patterns.

Figure 4:
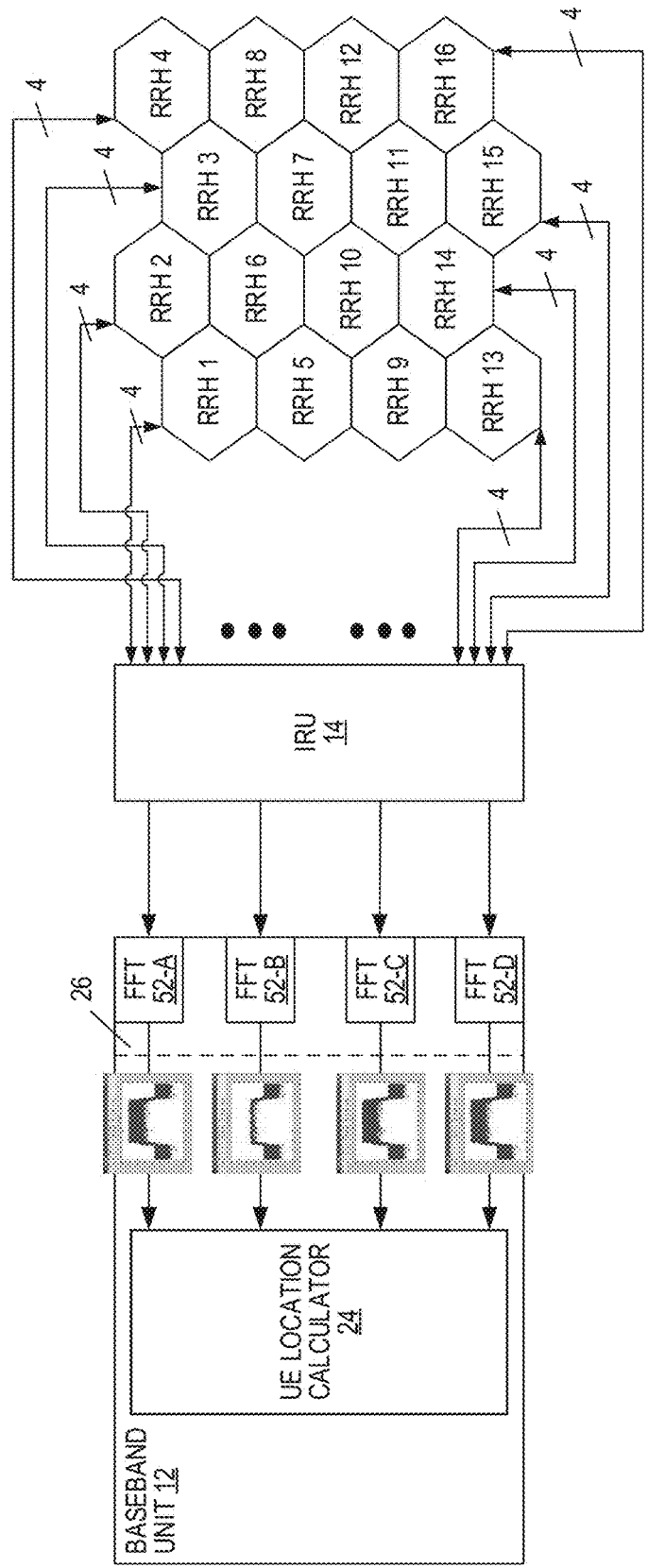
FIG. 4 illustrates the use of Fast Fourier Transform (FFT) outputs as signal strength measurements for the appropriate frequency and time resources used for uplink transmission by a wireless device and comparison of the signal strength measurements to the assigned ON/OFF patterns to determine the RRH closest to the wireless device according to some embodiments of the present disclosure.

As an example, RRH 12 is assigned the ON/OFF pattern of 1011 (i.e., ON, OFF, ON, ON) such that the receiver 18-A of RRH 12 for receive branch A is ON, the receiver 18-B of RRH 12 for receive branch B is OFF, the receiver 18-C of RRH 12 for receive branch C is ON, and the receiver 18-D of RRH 12 for receive branch D is ON. Therefore, as discussed below, when determining the location of a UE, this ON/OFF pattern is applied during reception of an uplink transmission from that UE. If the UE happens to be in the coverage area of the RRH 12, the uplink transmission will appear sufficiently strong in branches A, C, and D to be considered ON, but will appear sufficiently diminished in branch B to be considered OFF or 'mute' or 'silent'. This pattern is detected by the baseband unit 12, and in particular detected by the UE location calculator 24 by analyzing the outputs of the FFT bank 26 for the combined receive signals for the four receive branches. This is illustrated in FIG. 4 where the outputs of FFTs 52A, 52-B, and 52-D for branches A, C, and D, respectively, have large magnitudes in the frequency bin that corresponds to the known frequency resources (e.g., subcarrier frequencies) used for the uplink transmission, whereas the output of FFT 52-B for branch B has a small magnitude (e.g., due to a small signal strength received at some neighboring RRHs 16) in the frequency bin that corresponds to the known frequency resources used for the uplink transmission. Once the pattern is detected, the UE location calculator 24 can determine, based on a comparison of the detected pattern and the known patterns assigned to the RRHs 16, that the detected pattern is the pattern assigned to RRH 12. As a result, the UE location calculator 24 knows that the RRH 12 is the closest RRH to the UE. In this manner, the location of the UE is determined. For instance, if the RRHs 16 are spaced 20 m apart, the UE location calculator 24 knows that the UE is located±10 m from the known location of RRH 12. Note that, as discussed below, further procedures may be performed in some embodiments to further improve the precision of the location estimate for the UE.

Figure 5:
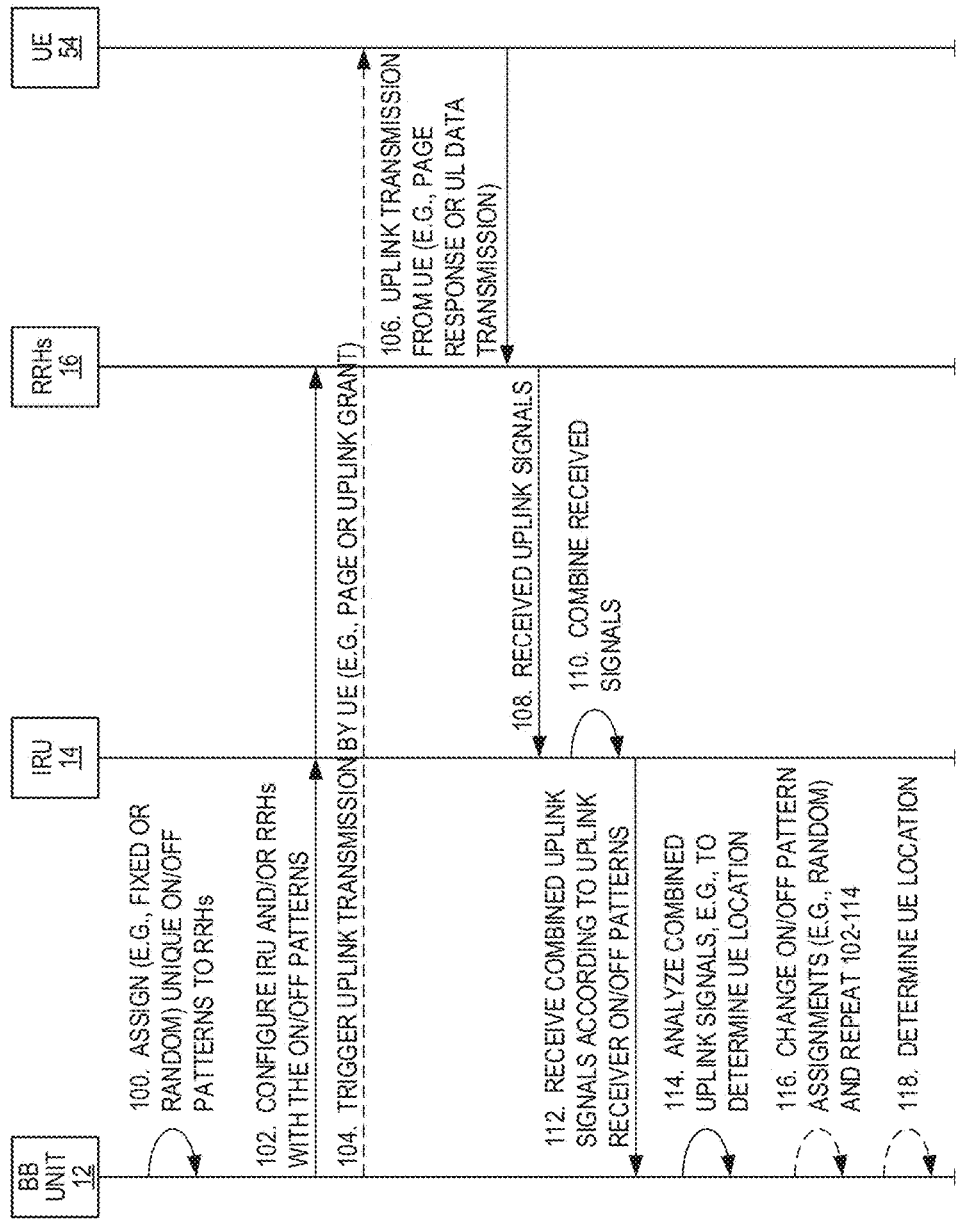
FIG. 5 illustrates a process for determining the location of a wireless device in a distributed antenna wireless system according to some embodiments of the present disclosure.

FIG. 5 illustrates the operation of the distributed antenna wireless system 10 to determine the location of a UE 54 (which may more generally be referred to herein as a wireless device) according to some embodiments of the present disclosure. As illustrated, the baseband unit 12, and in particular the ON/OFF pattern assignment generator 22, assigns different unique ON/OFF patterns to the RRHs 16 for the receivers 18 of the receive branches of the distributed antenna wireless system 10 (step 100). The ON/OFF patterns are also referred to herein as simultaneous ON/OFF patterns to emphasize that the ON/OFF patterns define the simultaneous ON/OFF states of the receivers 18 of the RRHs 16. In this embodiment, each of the RRHs 16 is assigned a different ON/OFF pattern. In other words, the number of available ON/OFF patterns is greater than or equal to the number of RRHs 16. The ON/OFF patterns may be assigned using any suitable assignment scheme such as, for example, randomly or is some predefined manner. For example, in some embodiments, Grey codes may be used when assigning the ON/OFF patterns.

The baseband unit 12, and in particular the ON/OFF pattern assignment generator 22, then configures the IRU 14 and/or the RRHs 16 with the assigned ON/OFF patterns (step 102). In some embodiments, the baseband unit 12 configures the RRHs 16 with the assigned ON/OFF patterns, in which case the RRHs 16 activate/deactivate their receivers 18 according to the configured ON/OFF patterns. This configuration of the RRHs 16 may, in some embodiments, be made by the IRU 14 under the control of the baseband unit 12 (e.g., the baseband unit 12 may provide the assigned ON/OFF patterns to the IRU 14, where the IRU 14 then controls/configures the RRHs 16 according to the assigned ON/OFF patterns). However, in other embodiments, the baseband unit 12 may alternatively configure the IRU 14 with the ON/OFF patterns for the RRHs 16 such that the IRU 14 combines the signals from the receivers 18 of the RRHs 16 for the different receive branches according to the ON/OFF patterns assigned and configured for the RRHs 16. For example, the IRU 14 may mute the signals from the receivers 18 that are configured as OFF (e.g., using switches or amplifying with a gain of zero) such that the combined signals are the combination of only those signals received by the receivers 18 that are configured as ON. In this manner, the IRU 14 effectively turns the receivers 18 of the RRHs 16 ON/OFF according to the assigned and configured ON/OFF patterns.

In some embodiments, the baseband unit 12, and in particular the UE location calculator 24, triggers an uplink transmission by the UE 54 (step 104). As indicated by the dashed line, this is an optional step that may not be performed in all embodiments. In some embodiments, the uplink transmission is triggered by paging the UE 54 by transmitting the appropriate paging message via the IRU 14 and the RRHs 16. This is particularly beneficial if the UE 54 is in IDLE state. In other embodiments, the uplink transmission is triggered by transmitting an uplink grant to the UE 54 via the IRU 14 and the RRHs 16. This is particularly beneficial if the UE 54 is in the CONNECTED or ATTACHED state. In either case, the baseband unit 12 knows which time and frequency resources will be used by the UE 54 for the triggered uplink transmission. As such, the configuration in step 102 is for the appropriate time window during which the triggered uplink transmission will occur.

The UE 54 then transmits an uplink transmission (e.g., a page response or an uplink data transmission) (step 106). The RRHs 16, and in particular the receivers 18 of the RRHs 16, listen for the uplink transmission and send resulting uplink, or received, signals to the IRU 14 (step 108). In some embodiments where the ON/OFF patterns are configured at the RRHs 16, the receivers 18 of the RRHs 16 are ON/OFF according to the configured ON/OFF patterns during reception of the uplink transmission. The IRU 14 combines the received signals to provide combined receive signals for the different receive branches (e.g., receive branches A, B, C, and D) of the distributed antenna wireless system 10 (step 110). In some embodiments where the ON/OFF patterns are configured at the IRU 14, the IRU 14 combines the received signals according to the ON/OFF patterns assigned to the corresponding RRHs 16.

The IRU 14 provides the combined signals to the baseband unit 12 (step 112). At this point, whether the ON/OFF patterns are applied at the IRU 14 or the RRHs 16, the combined signals are provided according to the assigned and configured ON/OFF patterns. The baseband unit 12, and in particular the UE location calculator 24, analyzes the combined signals (and, in particular, the results of FFTs of the combined signals) to determine, e.g., the location of the UE 54 (step 114). More specifically, the baseband unit 12 performs an FFT of each of the combined signals. The characteristic and/or magnitude of the FFTs for the frequency bin(s) corresponding to the frequency resource(s) on which the uplink transmission was transmitted are analyzed to determine an observed ON/OFF pattern. The observed ON/OFF pattern is then compared to the known, assigned ON/OFF patterns for the RRHs 16 to thereby determine the assigned pattern that matches the observed pattern. The RRH 16 to which the observed pattern was assigned is determined to be the closest RRH 16 to the UE 54 and, as such, the location of the UE 54 is determined to be within some predefined range (e.g., ±10 m if the RRHs 16 are installed 20 m apart from one another) from the closet RRH 16. This predefined range depends on the known spacing between the RRHs 16. As such, the precision of the determined location of the UE 54 in step 114 depends on the spacing, or density, of the RRHs 16. For example, if the spacing of the RRHs 16 is reduced to 10 m, then the precision of the location determined in step 114 can be improved to ±5 m.

Optionally, the baseband unit 12, and in particular the ON/OFF pattern assignment generator 22, changes the ON/OFF pattern assignments (e.g., randomly) and the process (i.e., steps 102-114) is repeated using the new assignments (step 116). This may be repeated one or more times. The location of the UE 54 may then be determined based on the results of the multiple iterations of the process (step 118). More specifically, each of the multiple, or successive, iterations produces a result. If all results are the same, the confidence level for the determined location increases. Repeating the process with new ON/OFF pattern assignments may be beneficial because, e.g., the receivers 18 of the RRHs 16 may have slightly different receiver sensitivity due to, e.g., manufacturing tolerances. Repeating the process with changing ON/OFF pattern assignments helps to improve the accuracy of the UE location determination.

Figure 6:
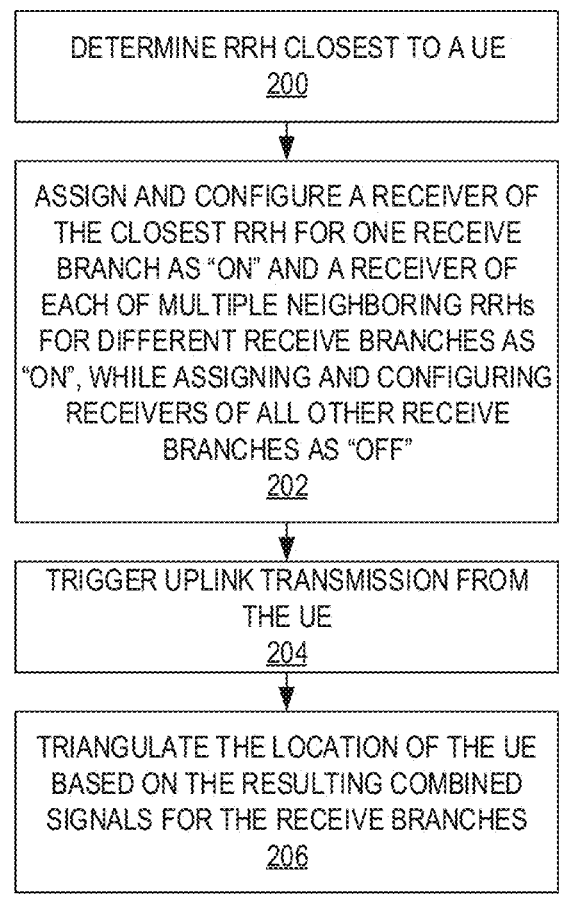
FIG. 6 is a flow chart that illustrates a process improving the precision of the location estimate for the wireless device according to some embodiments of the present disclosure.

In some implementations, it may be desirable to achieve greater precision in the location determined for the UE 54. In this regard, FIG. 6 illustrates a process by which a more precise location of the UE 54 can be determined according to some embodiments of the present disclosure. As with the description above, in this process, the location of the UE 54 is determined by the baseband unit 12. However, in all embodiments, while the description focuses on the baseband unit 12, the present disclosure is not limited thereto. The UE location calculator 24 may be implemented at some other node in the wireless network (e.g., at a Mobility Management Entity (MME) that communicates with the distributed antenna wireless system 10).

As illustrated, the RRH 16 that is closest to the UE 54 is determined, e.g., using the process of FIG. 6 (step 200). Then, in order to improve the precision of the location estimation, a triangulation procedure is performed. More specifically, the baseband unit 12 assigns and configures a receiver 18 of the closest RRH 16 for one receive branch as ON and a receiver 18 of each of multiple neighboring RRHs 16 for different receive branches as ON, while assigning and configuring all other receivers 18 of those RRHs 16 as OFF (step 202). For example, looking briefly at FIG. 3A, assume that the closest RRH 16 is RRH 9. Then, for example, the receiver 18-A of RRH 9 is assigned and configured as ON. Also, the receivers 18-B, 18-C, and 18-D of neighboring RRHs 5, 10, and 14 are assigned and configured as ON. All other receivers 18 of the RRHs 5, 9, 10, and 14 are assigned and configured as OFF. Notably, step 202 is only an example. More generally, the closest RRH 16 and the neighboring RRHs 16 are assigned different ON/OFF patterns for their respective receivers 18, where these different ON/OFF patterns may or may not activate more than one receiver 18 of the RRHs 16.

The baseband unit 12 then triggers an uplink transmission by the UE 54 (step 204). The baseband unit 12, and in particular the UE location calculator 24, then triangulates the location of the UE 54 based on the resulting combined signals for the receive branches (step 206). In particular, based on the known frequency resource(s) used by the UE 54 for the uplink transmission and the known ON/OFF patterns for the closest RRH 16 and the neighboring RRHs 16 assigned and configured in step 202, the baseband unit 12 can isolate the signals received from the closest RRH 16 and the neighboring RRHs 16 and triangulate the location of the UE 54 based on these signals. This isolation can be provided using the FFT bank 26, but is not limited thereto. Taking into account the various cable lengths between the IRU 14 and the RRHs 16, the signal strength and time of delay delta can be used to calculate how far away the UE 54 is from the closest RRH 16 and the neighboring RRHs 16. Triangulation from these data points can then be performed to accurately determine the location of the UE 54.

Figure 7A:
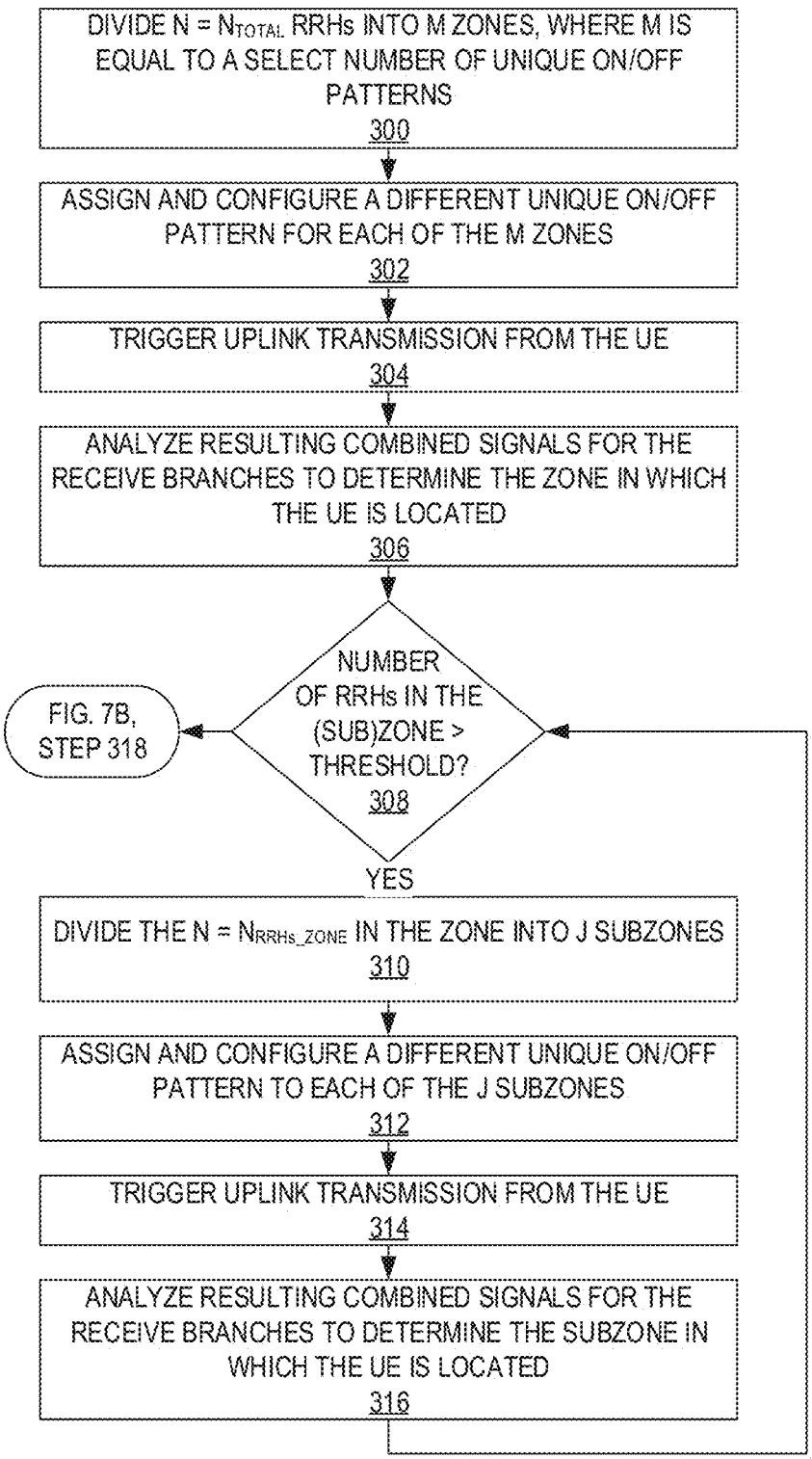
FIGS. 7A and 7B illustrate a process for determining the location of a wireless device in a distributed antenna wireless system according to some other embodiments of the present disclosure.
Figure 7B:
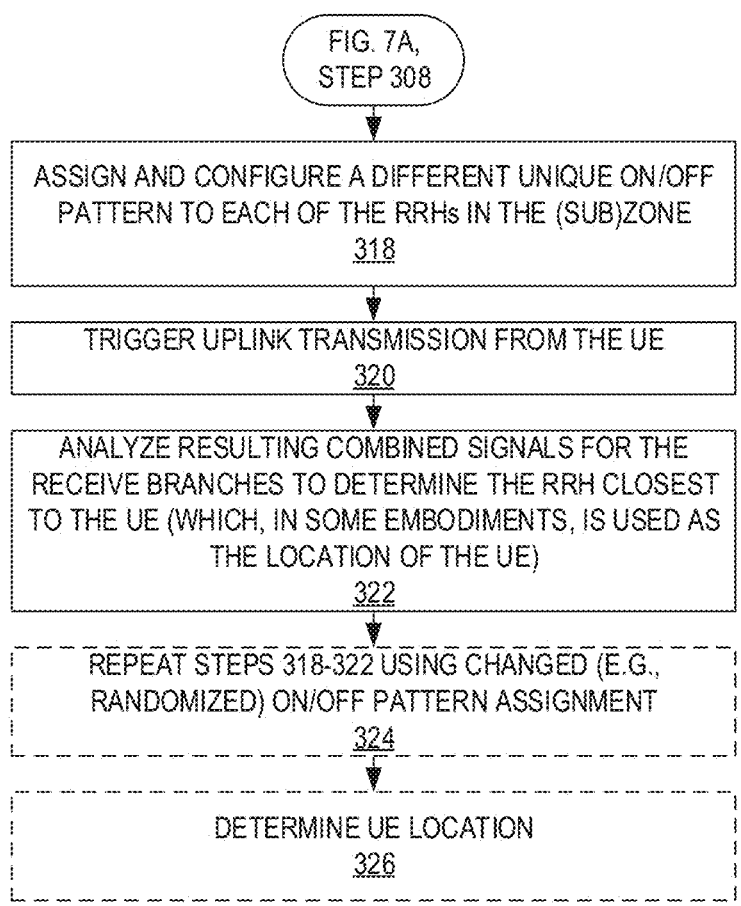

In some embodiments, the number of RRHs 16 is greater than the number of ON/OFF patterns available to assign to the RRHs 16. For example, in a 4×4 MIMO system, there may be, e.g., 16 available codes, but there may be more than 16 RRHs 16. FIGS. 7A and 7B illustrate a process for determining the location of a UE that is particularly well-suited for, but not limited to, this scenario. As illustrated, a number $N=N_{TOTAL}$ RRHs 16 are divided into M zones (step 300). $N_{TOTAL}$ is the total number of RRHs 16 in the geographic area to be searched. This may be, for example, the total number of RRHs 16 connected to the IRU 14 or a total number of RRHs 16 connected to multiple IRUs 14. M is, in this example, a select number of a total number of available unique ON/OFF patterns. For example, if the total number of available unique ON/OFF patterns is 16 (e.g., in the 4×4 MIMO case), M may be some select number of those 16 patterns (e.g., 8 ON/OFF patterns). The M ON/OFF patterns may include all available (i.e., all possible) ON/OFF patterns (e.g., all 16 available ON/OFF patterns for 4×4 MIMO) or some subset of all available ON/OFF patterns (e.g., some predefined subset of the 16 possible ON/OFF patterns for 4×4 MIMO).

The baseband unit 12 assigns and configures a different ON/OFF pattern for each of the M zones (step 302). As such, all of the RRHs 16 in the same zone are assigned and configured the same ON/OFF pattern. However, RRHs 16 in different zones are assigned with different ON/OFF patterns. The baseband unit 12 triggers an uplink transmission by the UE (step 304). The baseband unit 12 analyzes the resulting combined signals received by the different receive branches of the distributed antenna wireless system 10 in the manner described above to determine the zone in which the UE is located (step 306). More specifically, the baseband unit 12 analyzes the combined signals for the time and frequency resources used for the uplink transmission to determine an observed ON/OFF pattern in the manner described above. The baseband unit 12 then determines which zone was assigned and configured with the observed pattern. That zone is then identified as the zone in which the UE is located.

If number of RRHs 16 in the identified zone ($N_{RRHs\_ZONE}$) is greater than a predefined threshold (step 308; YES), then the RRHs 16 in the identified zone are divided into J subzones (step 310). The predefined threshold may be less than or equal to the total number of available ON/OFF patterns. As an example, the predefined threshold may be M. J is a select number of ON/OFF patterns. More specifically, J can be less than or equal to the total number of available ON/OFF patterns. Further, in some embodiments, J may be equal to M, but is not limited thereto.

The baseband unit 12 assigns and configures a different ON/OFF pattern for each of the J subzones (step 312). As such, all of the RRHs 16 in the same subzone are assigned and configured the same ON/OFF pattern. However, RRHs 16 in different subzones are assigned with different ON/OFF patterns. The baseband unit 12 triggers an uplink transmission by the UE (step 314). The baseband unit 12 analyzes the resulting combined signals received by the different receive branches of the distributed antenna wireless system 10 in the manner described above to determine the subzone in which the UE is located (step 316). More specifically, the baseband unit 12 analyzes the combined signals for the time and frequency resources used for the uplink transmission to determine an observed ON/OFF pattern in the manner described above. The baseband unit 12 then determines which subzone was assigned and configured with the observed pattern. That subzone is then identified as the subzone in which the UE is located. The process then returns to step 308 and is repeated for the identified subzone.

Once the number of RRHs 16 in the identified (sub)zone is less than or equal to the predefined threshold, the process proceeds as described above. Specifically, the baseband unit 12 assigns and configures a different ON/OFF pattern for each of the RRHs 16 in the identified (sub)zone (step 318). The baseband unit 12 triggers an uplink transmission by the UE (step 320). The baseband unit 12 analyzes the resulting combined signals received by the different receive branches of the distributed antenna wireless system 10 in the manner described above to determine the closest RRH 16 to the UE (step 322). More specifically, the baseband unit 12 analyzes the combined signals for the time and frequency resources used for the uplink transmission to determine an observed ON/OFF pattern in the manner described above. The baseband unit 12 then determines which RRH 16 was assigned and configured with the observed pattern. That RRH 16 is then identified as the RRH 16 that is closest to the UE. The location of the UE can then be estimated as being within some predefined range from the known location of the RRH 16. As discussed above, optionally, steps 318-322 may be repeated for a new ON/OFF pattern assignment(s), and the UE location can be determined based on the results (steps 324 and 326). Also, while not illustrated, once the closest RRH 16 is determined, the process of FIG. 6 may, in some embodiments, be performed to improve the precision of the determined location of the UE.

Note that the process of FIGS. 7A and 7B may be further extended to multiple base stations, or eNBs. In this extension, the process may, e.g., first isolate the base station that a particular wireless device of interest is associated with and then, as described above, search for the closest RRH 16.

Figure 8:
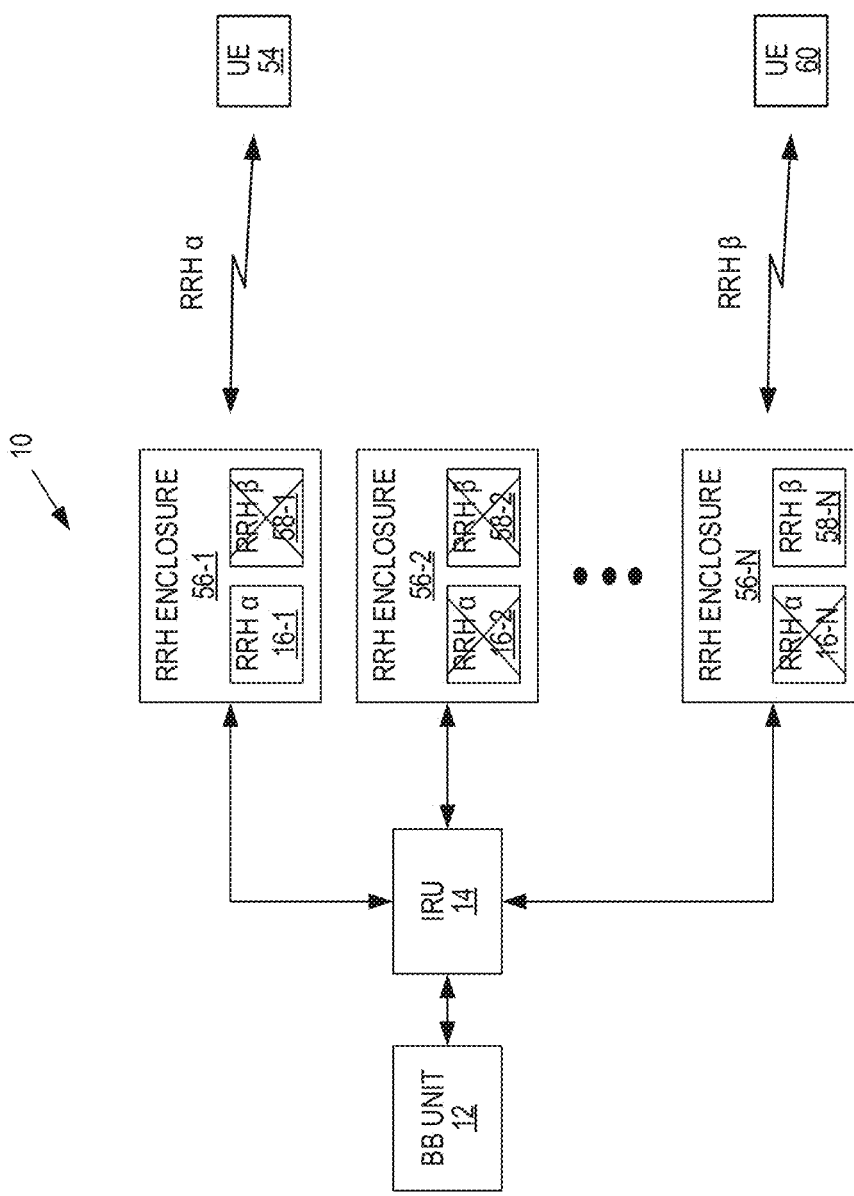
FIG. 8 graphically illustrates one example of the use of the determined location of a wireless device according to some embodiments of the present disclosure.

The location of the UE determined according to any of the embodiments described herein can be used for various purposes (e.g., Enhanced-911 (E911), location-based services, etc.). FIG. 8 illustrates one example of a use of the location of a UE 54. In this example, the location of the UE 54 is utilized for interference mitigation and/or beam-forming. This may be particularly beneficial in implementations in which the RRHs 16 utilize the same unregulated RF frequency band. As illustrated, in this example, the RRHs 16 are implemented in RRH enclosures 56-1 through 56-N (generally referred to as RRH enclosures 56) along with an additional set of RRHs 58-1 through 58-N (generally referred to herein as RRHs 58). These two sets of RRHs 16, 58 are referenced as set α and set β. Each RRH enclosure 56 includes one RRH 16 from set α and one RRH 58 from set β.

Upon determining that the UE 54 is closest to, in this example, the RRH 16-1 and that only the RRH 16-1 is needed to serve the UE 54, the RRH 58-1 can be turned OFF, at least as it pertains to serving the UE 54. Likewise, since the other RRHs 16 and 58 are not needed to serve the UE 54, those RRHs 16 and 58 can be turned OFF. However, in this example, at some distance away from UE 54, another UE 60 is located closest to the RRH 16-N (or the RRH 58-N). In this example, the RRH 58-N is activated to serve the UE 60, whereas the RRH 16-N is deactivated. In other words, the RRH 16-1 can be used to form a beam toward the UE 54, and the RRH 58-N can be used to form a beam toward the UE 60. This reduces the possibility of collision and mitigates interference. Finer granularity can be provided by switching individual RF branches within the RRHs 16, 58.

Some non-limiting advantages of at least some embodiments of the systems and methods described herein are as follows.

Simplicity: In some embodiments, the processes described herein can be limited to being implemented within a base station/distributed antenna wireless system 10 and there is no impact to other network nodes, e.g., the MME and/or no special application to be installed on the UE.

Low Costs: Some embodiments of the present disclosure may use existing equipment of a distributed antenna wireless system. No special or new equipment is required. As a result, such implementations do not require any capital investment (Capital Expenditures (CAPEX)) of special equipment or continuous maintenance cost (Operational Expenditures (OPEX)).

Fast: Some embodiments of the present disclosure may allow to determine the location of a UE in an amount of time that is in the order of seconds.

Improved Precision: The resolution of the UE location is down to, at least, an individual RRH 16. In some implementations, this provides a precision in the order of 20 m or less.

Ease of Use: Some embodiments of the present disclosure do not require any modification to the deployment and may be enabled remotely at a central office. There is no need of any field involvement.

The following acronyms are used throughout this disclosure.

3GPP Third Generation Partnership Project
A/D Analog to Digital
CAP EX Capital Expenditures
CSRIC Communications Security, Reliability, and Interoperability Council
D/A Digital to Analog
E911 Enhanced-911
eNB Enhanced or Evolved Node B
FCC Federal Communications Commission
FFT Fast Fourier Transform
GPS Global Positioning System
I/O Input/Output
IRU Intermediate Radio Unit
LTE Long Term Evolution
m Meter
MIMO Multiple Input Multiple Output
MME Mobility Management Entity
OPEX Operational Expenditures
RF Radio Frequency
RRH Remote Radio Head
RX Receiver
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of a node associated with a distributed antenna wireless system to determine a geographic location of a wireless device, comprising:
    obtaining one or more combined receive signals responsive to a transmission by a wireless device, wherein:
        the distributed antenna wireless system comprises a plurality of remote radio heads each comprising one or more receivers;

each receive branch of one or more receive branches of the distributed antenna wireless system comprises a combination of one receiver of the one or more receivers from each of the plurality of remote radio heads; and the one or more combined receive signals comprises, for each receive branch of the one or more receive branches of the distributed antenna wireless system, a combined receive signal that is a combination of signals received by the receivers comprised in the receive branch in accordance with different simultaneous ON/OFF patterns assigned to the plurality of remote radio heads for the one or more receive branches; and analyzing the one or more combined receive signals to determine information indicative of a geographic location of the wireless device.

2. The method of claim 1 wherein:

each remote radio head of the plurality of remote radio heads comprises a plurality of receivers;

the one or more receive branches is a plurality of receive branches wherein each receive branch of the plurality of receive branches comprises a combination of one receiver of the plurality of receivers from each of the plurality of remote radio heads; and the one or more combined receive signals is a plurality of combined receive signals that comprise, for each receive branch of the plurality of receive branches, a combined receive signal that is a combination of signals received by the receivers comprised in the receive branch in accordance with different simultaneous ON/OFF patterns assigned to the plurality of remote radio heads for the plurality of receive branches.

3. The method of claim 2 further comprising assigning the different simultaneous ON/OFF patterns to the plurality of remote radio heads for the plurality of receive branches.

4. The method of claim 3 wherein assigning the different simultaneous ON/OFF patterns to the plurality of remote radio heads for the plurality of receive branches comprises randomly assigning the different simultaneous ON/OFF patterns to the plurality of remote radio heads for the plurality of receive branches.

5. The method of claim 2 further comprising configuring the plurality of remote radio heads with the different simultaneous ON/OFF patterns assigned to the plurality of remote radio heads for the plurality of receive branches.

6. The method of claim 2 wherein the signals received by the receivers are combined by an Intermediate Radio Unit, IRU, and the method further comprises configuring the IRU with the different simultaneous ON/OFF patterns assigned to the plurality of remote radio heads for the plurality of receive branches.

7. The method of claim 2 further comprising triggering the transmission by the wireless device.

8. The method of claim 7 wherein triggering the transmission by the wireless device comprises triggering the transmission by the wireless device via a paging message such that the transmission is a page response.

9. The method of claim 7 wherein triggering the transmission by the wireless device comprises triggering the transmission by the wireless device via an uplink grant such that the transmission is an uplink data transmission in accordance with the uplink grant.

10. The method of claim 2 wherein analyzing the plurality of combined receive signals comprises:

obtaining measurements of received signal energy and/or one or more signal characteristics for the plurality of combined receive signals within a predefined frequency range used for the transmission by the wireless device during a corresponding time window; and comparing the measurements for the plurality of combined receive signals to the different simultaneous ON/OFF patterns assigned to the plurality of remote radio heads for the plurality of receive branches of the distributed antenna wireless system to identify one of the plurality of remote radio heads that is closest to the wireless device as a closest remote radio head.

11. The method of claim 10 further comprising:

changing the different simultaneous ON/OFF patterns assigned to the plurality of remote radio heads; and after changing the different simultaneous ON/OFF patterns assigned to the plurality of remote radio heads, repeating the process of obtaining a plurality of combined receive signals responsive to a transmission by a wireless device and analyzing the plurality of combined receive signals to determine information indicative of the geographic location of the wireless device.

12. The method of claim 10 further comprising:

assigning and configuring a different ON/OFF pattern for the closest remote radio head and each remote radio head of multiple neighboring remote radio heads of the closest remote radio head;

triggering a second transmission by the wireless device; and triangulating the geographic location of the wireless device based on second combined signals obtained for the plurality of receive branches of the distributed antenna wireless system responsive to the second transmission by the wireless device.

13. The method of claim 2 further comprising using the information indicative of the geographic location of the wireless device to selectively activate transmitters and/or receivers of one or more of the plurality of remote radio heads for communication with the wireless device.

14. A node associated with a distributed antenna wireless system operable to determine a geographic location of a wireless device, comprising:

a subsystem operable to:

obtain one or more combined receive signals responsive to a transmission by a wireless device, wherein:

the distributed antenna wireless system comprises a plurality of remote radio heads each comprising one or more receivers;

each receive branch of one or more receive branches of the distributed antenna wireless system comprises a combination of one receiver of the one or more receivers from each of the plurality of remote radio heads; and the one or more combined receive signals comprises, for each receive branch of the one or more receive branches of the distributed antenna wireless system, a combined receive signal that is a combination of signals received by the receivers comprised in the receive branch in accordance with different simultaneous ON/OFF patterns assigned to the plurality of remote radio heads for the one or more receive branches; and analyze the one or more combined receive signals to determine information indicative of a geographic location of the wireless device.

15. The node of claim 14 wherein:

each remote radio head of the plurality of remote radio heads comprises a plurality of receivers;

the one or more receive branches is a plurality of receive branches wherein each receive branch of the plurality of receive branches comprises a combination of one receiver of the plurality of receivers from each of the plurality of remote radio heads; and the one or more combined receive signals is a plurality of combined receive signals that comprise, for each receive branch of the plurality of receive branches, a combined receive signal that is a combination of signals received by the receivers comprised in the receive branch in accordance with different simultaneous ON/OFF patterns assigned to the plurality of remote radio heads for the plurality of receive branches.

16. The node of claim 15 further comprising an ON/OFF pattern assignment generator operable to:
assign the different simultaneous ON/OFF patterns to the plurality of remote radio heads for the plurality of receive branches; and
configure the plurality of remote radio heads with the different simultaneous ON/OFF patterns assigned to the plurality of remote radio heads for the plurality of receive branches.

17. The node of claim 15 wherein the signals received by the receivers are combined by an Intermediate Radio Unit, IRU, and the node further comprises:
an ON/OFF pattern assignment generator operable to:
assign the different simultaneous ON/OFF patterns to the plurality of remote radio heads for the plurality of receive branches; and
configure the IRU with the different simultaneous ON/OFF patterns assigned to the plurality of remote radio heads for the plurality of receive branches.

18. The node of claim 15 wherein the subsystem comprises:
circuitry operable to obtain measurements of received signal energy and/or one or more characteristics for the plurality of combined receive signals within a predefined frequency range used for the transmission by the wireless device during a corresponding time window; and
a location calculator operable to compare the measurements for the plurality of combined receive signals to the different simultaneous ON/OFF patterns assigned to the plurality of remote radio heads for the plurality of receive branches of the distributed antenna wireless system to identify one of the plurality of remote radio heads that is closest to the wireless device as a closest remote radio head.

19. The node of claim 18 wherein the subsystem is further operable to:
change the different simultaneous ON/OFF patterns assigned to the plurality of remote radio heads; and
after changing the different simultaneous ON/OFF patterns assigned to the plurality of remote radio heads, repeat the process of obtaining a plurality of combined receive signals responsive to a transmission by a wireless device and analyzing the plurality of combined receive signals to determine information indicative of the geographic location of the wireless device.

20. The node of claim 18 wherein the subsystem is further operable to:
assign and configure a different ON/OFF pattern for the closest remote radio head and each remote radio head of multiple neighboring remote radio heads of the closest remote radio head;
trigger a second transmission by the wireless device; and
triangulate the geographic location of the wireless device based on second combined signals obtained for the plurality of receive branches of the distributed antenna wireless system responsive to the second transmission by the wireless device.

21. The node of claim 15 wherein the node is further operable to use the information indicative of the geographic location of the wireless device to selectively activate transmitters and/or receivers of one or more of the plurality of remote radio heads for transmission to the wireless device.

22. A distributed antenna wireless system, comprising:
a plurality of remote radio heads each comprising one or more receivers, wherein each receive branch of one or more receive branches of the distributed antenna wireless system comprises one receiver of the one or more receivers from each of the plurality of remote radio heads;
an Intermediate Radio Unit, IRU, operable to combine, for each receive branch of the one or more receive branches of the distributed antenna wireless system, signals received by the receivers comprised in the receive branch to provide a combined receive signal for the receive branch; and
a baseband unit operable to:
assign and configure different simultaneous ON/OFF patterns for the plurality of remote radio heads for the one or more receive branches;
trigger a transmission by a wireless device;
obtain one or more combined receive signals responsive to the transmission by the wireless device, where the one or more combined receive signals are in accordance with the different simultaneous ON/OFF patterns assigned and configured for the plurality of remote radio heads for the one or more receive branches; and
analyze the one or more combined receive signals to determine information indicative of a geographic location of the wireless device.

23. The distributed antenna wireless system of claim 22 wherein:
each remote radio head of the plurality of remote radio heads comprises a plurality of receivers;
the one or more receive branches is a plurality of receive branches wherein each receive branch of the plurality of receive branches comprises a combination of one receiver of the plurality of receivers from each of the plurality of remote radio heads; and
the one or more combined receive signals is a plurality of combined receive signals that comprise, for each receive branch of the plurality of receive branches, a combined receive signal that is a combination of signals received by the receivers comprised in the receive branch in accordance with different simultaneous ON/OFF patterns assigned to the plurality of remote radio heads for the plurality of receive branches.

24. A method of operation of a node associated with a distributed antenna wireless system to determine a geographic location of a wireless device, comprising:
dividing a plurality of remote radio heads in the distributed antenna wireless system into M zones, where M is equal to a select number of different simultaneous ON/OFF patterns for a plurality of receive branches of the distributed antenna wireless system;
assigning and configuring a different simultaneous ON/OFF pattern for the plurality of receive branches to each of the M zones;
triggering a transmission by a wireless device;

analyzing resulting combined receive signals for the plurality of receive branches to identify a zone, from the M zones, in which the wireless device is located; and if the number of remote radio heads in the identified zone is less than or equal to a threshold, the threshold being equal to or less than a number of available different simultaneous ON/OFF patterns:

assigning and configuring a different simultaneous ON/OFF pattern for the plurality of receive branches to each of the remote radio heads in the identified zone;

triggering a transmission by the wireless device; and analyzing resulting combined receive signals for the plurality of receive branches to identify the remote radio head, from the remote radio head in the identified zone, that is closest to the wireless device.

25. The method of claim 24 further comprising, if the number of remote radio heads in the identified zone is greater than the threshold:

dividing the remote radio heads in the identified zone into J subzones, where J is equal to a select number of different simultaneous ON/OFF patterns for the plurality of receive branches of the distributed antenna wireless system and J may or may not be equal to M;

assigning and configuring a different simultaneous ON/OFF pattern for the plurality of receive branches to each of the J subzones;

triggering a transmission by the wireless device; and analyzing resulting combined receive signals for the plurality of receive branches to identify a subzone, from the J subzones, in which the wireless device is located.

26. The method of claim 25 further comprising successively repeating the steps of dividing, assigning, triggering, and analyzing for the identified subzone until the number of remote radio heads in the identified subzone is less than or equal to the threshold.

27. The method of claim 25 further comprising, when the number of remote radio heads in the identified subzone is less than or equal to the threshold:

assigning and configuring a different simultaneous ON/OFF pattern for the plurality of receive branches to each of the remote radio heads in the identified subzone;

triggering a transmission by the wireless device; and analyzing resulting combined receive signals for the plurality of receive branches to identify the remote radio head, from the remote radio head in the identified subzone, that is closest to the wireless device.

* * * * *